United States Patent
Hsu et al.

(10) Patent No.: US 7,149,203 B2
(45) Date of Patent: Dec. 12, 2006

(54) MECHANISMS OF CONTROL HOLD OPERATION AND MAC_ID ASSIGNMENT FOR CDMA2000 1xEV-DV REVERSE ENHANCED HIGH-SPEED PACKET DATA CHANNEL

(75) Inventors: Liangchi Hsu, San Diego, CA (US); Mark W. Cheng, San Diego, CA (US); Zhouyue Pi, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/817,214

(22) Filed: Apr. 2, 2004

(65) Prior Publication Data

US 2004/0196820 A1 Oct. 7, 2004

Related U.S. Application Data

(60) Provisional application No. 60/460,514, filed on Apr. 4, 2003.

(51) Int. Cl.
*H04B 7/216* (2006.01)
(52) U.S. Cl. ...................... 370/335; 370/342
(58) Field of Classification Search ............... 370/352, 370/328, 311, 318, 335, 342, 338; 713/300, 713/310, 320, 323
See application file for complete search history.

(56) References Cited

U.S. PATENT DOCUMENTS

| 6,622,251 B1* | 9/2003 | Lindskog et al. ........... 713/300 |
| 6,700,877 B1* | 3/2004 | Lorenz et al. ............... 370/254 |
| 6,714,524 B1* | 3/2004 | Kim et al. ................... 370/335 |
| 2002/0177461 A1* | 11/2002 | Rosen et al. ................ 455/518 |
| 2003/0117969 A1* | 6/2003 | Koo et al. ................... 370/318 |
| 2003/0128683 A1* | 7/2003 | Ho et al. ..................... 370/338 |
| 2003/0223396 A1* | 12/2003 | Tsai et al. ................... 370/342 |
| 2004/0017792 A1* | 1/2004 | Khaleghi et al. ........... 370/335 |
| 2004/0047328 A1* | 3/2004 | Proctor et al. .............. 370/342 |

\* cited by examiner

*Primary Examiner*—Brian Nguyen
(74) *Attorney, Agent, or Firm*—Harrington & Smith, LLP

(57) ABSTRACT

Disclosed herein are methods and apparatus for incorporation of a Reverse Link Control Hold Mode and MAC_ID assignment in a cdma2000 1xEV-DV communications system. The teachings herein provide for a reverse link Control Hold Mode for a cellular communications system, wherein a mobile station uses an R-PDCH channel with or without an F-PDCH channel being assigned; alternatively, where a mobile station uses a F-PDCH channel without an R-PDCH channel. A medium access control identification code (MAC_ID) assigned by a base station from a MAC_ID space to each one of a plurality of mobile stations; wherein the MAC_ID is assigned in an ascending (or descending) order from the MAC_ID space for a first group of mobile stations, and wherein the MAC_ID is assigned in a descending (or ascending) order from the MAC_ID space for a second group of mobile stations.

22 Claims, 3 Drawing Sheets

MECHANISMS OF CONTROL HOLD OPERATION AND MAC_ID ASSIGNMENT FOR CDMA2000 1xEV-DV REVERSE ENHANCED HIGH-SPEED PACKET DATA CHANNEL

CLAIM OF PRIORITY FROM A COPENDING U.S. PROVISIONAL PATENT APPLICATION

This patent application claims priority under 35 U.S.C. 119(e) from Provisional Patent Application No. 60/460,514, filed Apr. 4, 2003, the content of which is incorporated by reference herein in its entirety.

TECHNICAL FIELD OF THE INVENTION

This invention relates generally to cellular packet data transmission techniques, and more specifically to a reverse link Control Hold Mode and MAC_ID assignment for cdma2000 1xEV-DV.

BACKGROUND OF THE INVENTION

The objective of a "Control Hold" mode for a mobile station is two-fold: (1) to decrease the latency period for reactivation, and (2) to increase the battery life during the inactive period. The mobile station can be transitioned to Control Hold Mode when inactive for a period of time, for example, hundreds of milliseconds.

In 1xEV-DV (data and voice) systems, the Control Hold Mode was incorporated into Rev. C standards for F-PDCH (Forward Packet Data Channel) operation. While much attention has been paid to the high-speed packet data Reverse Link, the inventors have realized that a Control Hold Mode for the new Reverse Packet Data Channel will also be useful.

SUMMARY OF THE INVENTION

The expected enhancements to the R-SCH (Reverse Supplemental Channel) will raise concerns of battery life and forward link capacity. To address these concerns, the teachings herein disclose an enhanced control hold operation which takes advantage of the introduction of the R-PDCH (Reverse Packet Data Channel).

The teachings herein provide for enhancement to the control-hold operation originally specified in cdma2000 1xEV-DV Revision C, and take into account the introduction of a reverse high speed packet data channel in Rev. D of the standard for cdma2000 1xEV-DV. The teachings herein also address the Control Hold Mode behaviors, as well as the transition mechanism between different modes (i.e. active state, Control Hold Mode, and idle state).

Also disclosed herein is an enhanced scheme for MAC_ID assignment, wherein the MAC_ID (Medium Access Control Identification Code) is used not only for the cdma2000 1xEV-DV forward link (e.g., F-PDCH in revision C), but also for the reverse link (e.g., R-PDCH in revision D) for user traffic identification. In other words, the teachings herein provide for a system where the base station assigns the MAC_ID to a mobile station whenever either direction of the 1xEV-DV high-speed packet data channels, F-PDCH or R-PDCH, is assigned.

The teachings herein provide a medium access control identification code (MAC_ID) assigned by a base station from a MAC_ID space to each one of a plurality of mobile stations; wherein the MAC_ID is assigned in an ascending (or descending) order from the MAC_ID space for a first group of mobile stations, and wherein the MAC_ID is assigned in a descending (or ascending) order from the MAC_ID space for a second group of mobile stations.

The teachings herein also address Control Hold Mode operation for both cases given below, wherein:
  Case 1: When R-PDCH is in operation without F-PDCH assignment; and,
  Case 2: When both R-PDCH and F-PDCH are assigned.

The teachings herein address, the Control Hold Mode as above, wherein the first group of mobile stations comprises mobile stations using an R-PDCH channel along with, or without, the F-PDCH assigned; and, wherein the second group of mobile stations comprises mobile stations using an F-PDCH channel without an R-PDCH channel.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The teachings herein resolve how to reuse the MAC_ID assignment to handle both high-speed forward link and reverse link traffic, as well as to provide mechanisms to transition the Control Hold Mode from the active state and an idle state. Behavior attributes for the mobile station and the base station during the operation of 1xEV-DV Control Hold Mode are disclosed. This provides for enhanced operation of the 1xEV-DV reverse link Control Hold Mode; and also saves battery life in a mobile station, and provides for increased system capacity.

The disclosure herein calls for the use of the same MAC_ID in, for example, a cdma2000 1xEV-DV Revision D implementation for the forward link and the reverse link for user traffic identification. In Revision C of the cdma2000 1xEV-DV standard, the forward link is referred to as F-PDCH, while the reverse link introduced in revision D is referred to as R-PDCH.

Figure 1:
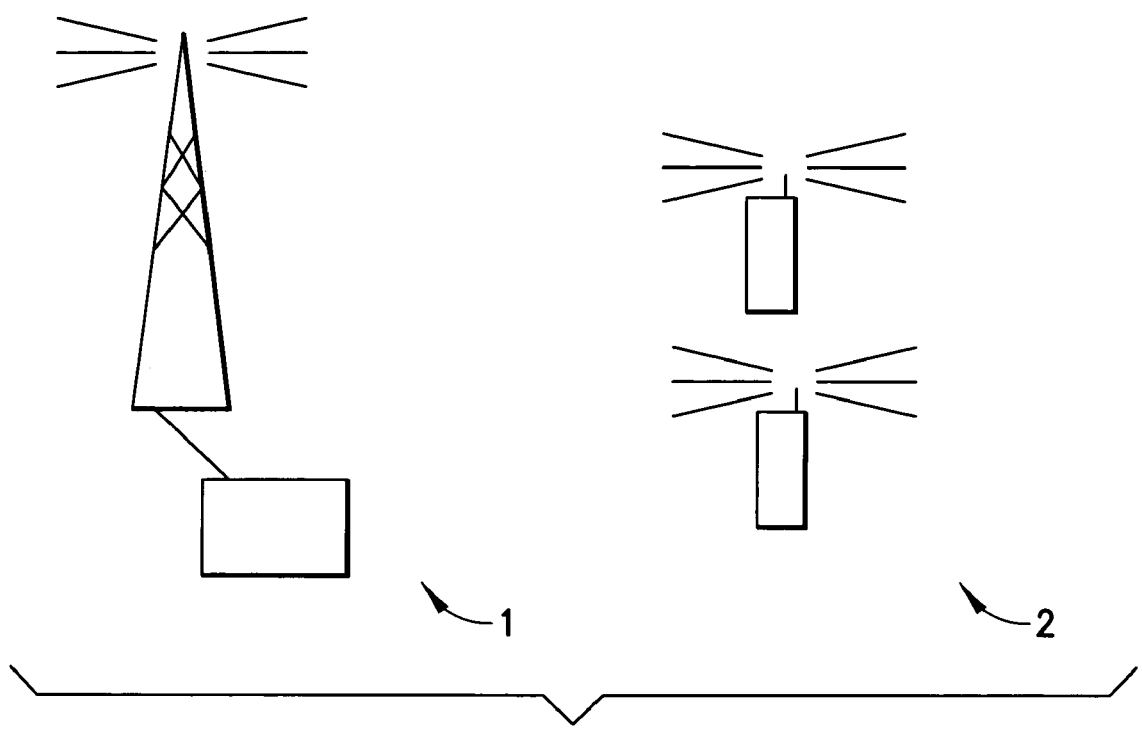
FIG. 1 is an illustration of components of a communication system.

Referring to FIG. 1, the communications system includes a base station 1 and a plurality of mobile stations 2. Depending upon the context, the term base station 1 may refer to a cell, a sector within a cell, or another part of the communication system (as defined in the cdma2000 1xEV-DV standard, Revision C). The mobile stations 2 communicate with the base station 1. In the system disclosed herein, the MAC_ID is assigned to a mobile station 2 through the base station 1 whenever either or both directions of the 1xEV-DV high-speed packet data channels, F-PDCH or R-PDCH, are allocated.

1xEV-DV supports both forward and reverse link Hybrid Automatic Repeat Request (HARQ). A forward channel is required for the base station 1 to acknowledge the transmissions on the R-PDCH. If the acknowledgement channel is a common channel, designated as the Forward Acknowledgement Channel (F-ACKCH), then one way of addressing active mobile stations 2 is by a bitmap of MAC_IDs. For example, if bit 1 carried by the F-ACKCH is used to signal the mobile station 2 with MAC_ID X, then bit 2 is used to signal the next MAC_ID X+1. This approach conserves bandwidth since an explicit 8-bit MAC_ID is not required.

The MAC_ID allocation and arrangement is designed for efficient use of the bitmap of MAC_IDs carried in F-ACKCH. It is noted that if the MAC_ID is assigned randomly for the users with or without a R-PDCH assignment, some of the bits in the bitmap carried by the F-ACKCH can be wasted, for example, if these bits are used to signal the mobile units that do not transmit on R-PDCH (i.e. the mobile units do not need to receive ACK/NAK in the F-ACKCH from the base station 1). Accordingly, the teachings herein provide for the use of separate segments of the available MAC_IDs for R-PDCH users.

Figure 2:
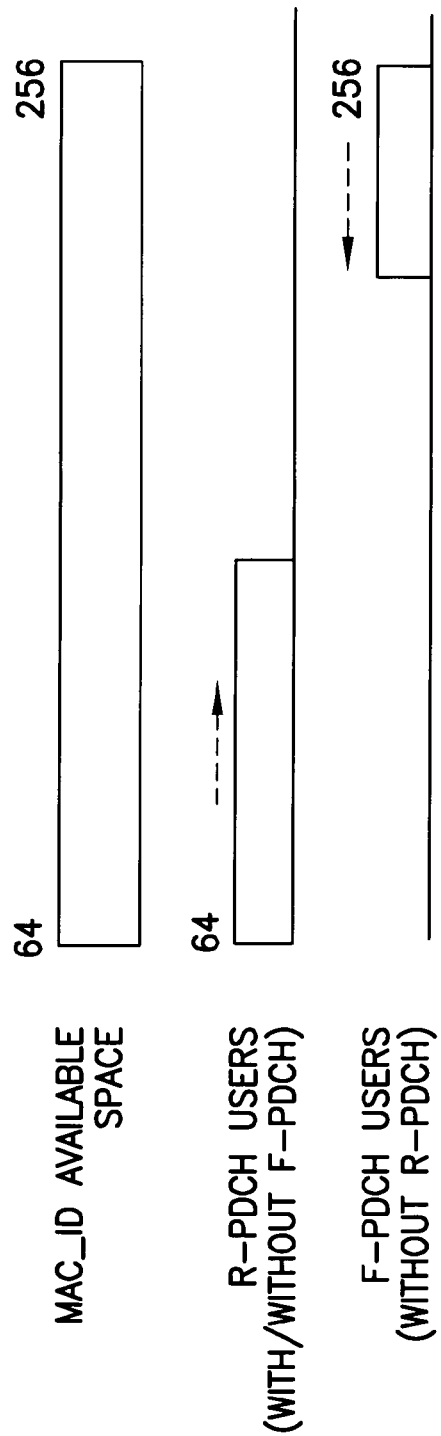
FIG. 2 shows an example of a MAC_ID assignment.

FIG. 2 shows an example of a MAC_ID assignment. If the available MAC_IDs are from 64 to 256, R-PDCH users (with or without F-PDCH) are always assigned the first available MAC_ID from 64 upwards. On the other hand, F-PDCH users (without R-PDCH) are assigned from 256 downwards. This method of assignment reduces the gaps whenever the R-PDCH users are addressed by a bitmap field.

The MAC_IDs can be reserved in blocks. A user having assigned a MAC_ID within a certain block can monitor the channel corresponding to that bitmap field. This reduces the signaling required in order for the mobile unit to identify which bitmap field (F-ACKCH) to monitor.

Figure 3:
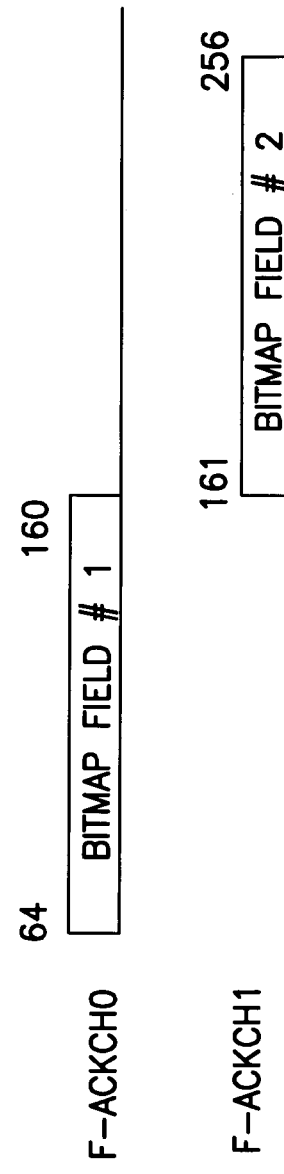
FIG. 3 shows an example of two MAC_ID blocks.

FIG. 3 shows an example of two MAC_ID blocks. F-ACKCH0 carries bitmap field #1 starting from 64 to 160 and F-ACKLH1 carries bitmap field #2 from 161 to 256. A mobile station 2 with a MAC_ID less than or equal to 160 monitors F-ACKCH0 to receive signaling from a base station 1. A mobile station 2 with a MAC_ID greater than 160 monitors F-ACKCH1 for signaling.

The teachings herein take into account the design and enhancements of reverse high speed packet data channel appearing in the standard for cdma2000 1xEV-DV Revision D, and also address Control Hold Mode behaviors as well as the transition mechanism between different modes (i.e. active state, Control Hold Mode, and idle state). Therefore, the teachings herein provide enhancements to the control-hold operation that has been specified in cdma2000 1xEV-DV Revision C. Hence, the teachings herein address Control Hold Mode operations for both cases, wherein:

Case 1: When R-PDCH is in operation without F-PDCH assignment; and,
Case 2: When both R-PDCH and F-PDCH are assigned.

The case where R-PDCH is in operation without an F-PDCH assignment is now discussed. First, note that certain attributes of a mobile station 2 in 1xEV-DV Control Hold Mode include the following:

1. The Reverse Pilot is gated (i.e. PILOT_GATING_USE_RATE is set to 1). This is the same as 1x EV-DV Rev. C control hold;
2. The Reverse Rate Request Channel (R-REQCH) is gated at a reduced rate, which can be ½, ¼ or lower rates, or completely OFF;
3. The mobile station 2 is not required to monitor the Forward Acknowledgment Channel (F-ACKCH);
4. The mobile station 2 monitors the Forward Grant Channel (F-GCH) continuously. The rate of F-GCH can be reduced in order to reduce the mobile power consumption. Note that F-ACKCH is a channel that is used by the base station 1 to perform reverse traffic physical layer ARQ (Automatic Repeat Request) acknowledgement. Also note that the F-GCH is a channel that is used by the base station 1 to grant reverse link access;
5. Forward data traffic and signaling traffic are blocked by the Multiplex sub-layer of the base station 1. This is similar to 1x Control Hold; and,
6. Reverse data traffic is blocked by the Multiplex sub-layer of the mobile station 2.

When the mobile station 2 initiates the transition from control hold to active state, the following occurs:

1. The mobile station 2 turns on the Rate Request Channel (R-REQCH) and requests low rate (autonomous) R-PDCH transmission;
2. The mobile station 2 starts to monitor the Rate Grant channel (F-GCH);
3. The granting base station 1 sends an individual Grant to the mobile station 2 to acknowledge the reception of mode transition request (as described in step 1) and grants permission to transmit;
4. Once the mobile station 2 gets the grant from the base station 1, the mobile station 2 transitions to active state and starts to transmit on the Reverse Link in autonomous mode. Mobile station 2 will re-transmit the rate request if the grant is not received either due to a missed request or a missed grant; and,
5. The mobile station 2 starts to monitor Forward Acknowledgement Channel (F-ACKCH).

When the base station 1 signals the mobile station 2 to initiate the transition from Control Hold Mode, the following occurs:

1. The granting base station 1 sends an individual Grant via F-GCH to the mobile station 2 to initiate the mode transition; and,
2. The mobile station 2 transitions to active state.

When the mobile station 2 initiates the transition from active state to Control Hold Mode, the following occurs:

1. The mobile station 2 gates the Reverse pilot and Reverse Rate Request channel;
2. Once the base station 1 detects the transition indication, the base station 1 stops the transmission on F-ACKCH and stops monitoring R-PDCH; and,
3. The mobile station 2 transitions to Control Hold Mode.

Figure 4:
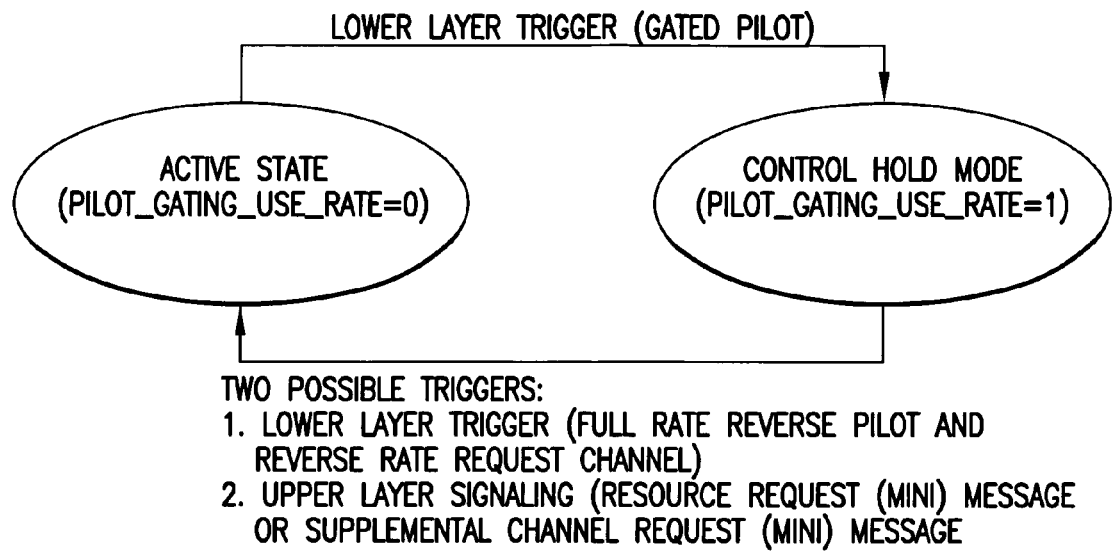
FIG. 4 illustrates "Mobile Station Initiated" mode transitions.

FIG. 4 illustrates "Mobile Station Initiated" mode transitions.

The case where both R-PDCH and F-PDCH are assigned is now discussed. First, note that certain attributes of a mobile station 2 in 1xEV-DV Control Hold Mode of Traffic Channel Substate include the following:

1. The reverse pilot gating is enabled (i.e. PILOT_GATING_USE_RATE is set to 1);
2. The Reverse pilot (r-pich) may be gated (if PILOT_GATING_RATEs is not equal to
3. If a Forward Packet Data Channel is not assigned, then the flow of data traffic is blocked by the Multiplex Sublayer;
4. If a Forward Packet Data Channel is assigned, then the flow of both data traffic and signaling traffic is blocked by the Sublayer.

Also, note that certain attributes of a mobile station 2 in 1xEV-DV Control Hold Mode include the following:

1. The Reverse pilot is gated (i.e. PILOT_GATING_USE_RATE is set to 1). This is the same as 1xEV-DV Rev. C;
2. When PILOT_GATING_USE_RATE is equal to 1 (Control Hold Mode), the mobile station 2 must monitor the two F-PDCCH (Forward Packet Data Control Channel) channels without demodulating the F-PDCH channel;

3. The Reverse Channel Quality Indication Channel (R-CQICH) is gated at a reduced rate, which can be ½ or ¼ rates;

4. The mobile station 2 does not monitor the F-PDCH/F-ACKCH;

5. The R-ACKCH (Reverse Acknowledgment Channel) is turned off;

6. The mobile station 2 monitors the F-PDCCH (Forward Packet Data Control Channel) continuously;

7. Forward data traffic and signaling traffic are blocked by the Multiplex sub-layer of the base station 1; and, 8. Reverse data traffic is blocked by the Multiplex sub-layer of the mobile station 2.

When the mobile station 2 originates the transition from control hold to active state, the following occurs:

1. If the mobile station 2 PILOT_GATING_USE_RATE is equal to 1 (Control Hold Mode) and the EXT_MSG_TYPE='00' (Control Hold Mode), the mobile station 2 sends an ACK on the R-ACKCH;

2. The mobile station 2 turns on the Rate Request Channel (R-REQCH) and requests (if requested rate is higher than autonomous rate) R-PDCH transmission;

3. The mobile station 2 starts to monitor the Rate Grant channel (F-GCH) and the Forward Acknowledgement Channel (F-ACKCH);

4. The granting base station 1 sends an individual Grant to the mobile station 2 to acknowledge the reception of the mode transition request and to grant permission to transmit;

5. The mobile station 2 starts to transmit continuously on the R-CQICH;

6. The mobile station 2 turns on the R-ACKCH and starts to monitor the F-PDCCH; and, 7. The mobile station 2 transitions to Active and starts to transmit on the Reverse Link once having received the grant from the base station 1. Mobile station 2 will re-transmit the rate request if the grant is not received either due to a missed request or a missed grant.

When base station 1 signals the mobile station 2 to initiate a mode transition from the Control Hold Mode, the following occurs:

1. The base station 1 sets the EXT_MSG_TYPE—Extended Message Type Identifier field to '00' to indicate that the mobile station 2 is to exit PDCH Control Hold Mode;

2. The base station 1 sends a F-PDCCH message with a MAC_ID set to the mobile station 2 and a specific message type to initiate the mode transition;

3. The mobile station 2 turns on its R-CQICH and R-ACKCH, and starts to monitor the F-PDCCH;

4. The mobile station 2 transitions to Active state.

Figure 5:
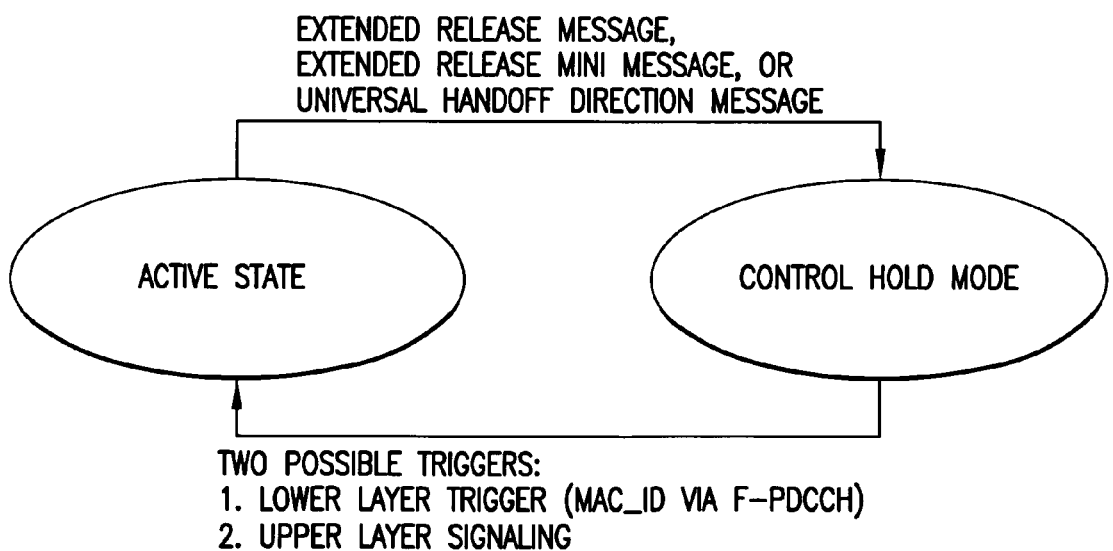
FIG. 5 illustrates "Base Station Initiated" mode transitions.

FIG. 5 illustrates "Base Station Initiated" mode transitions.

When mobile station 2 initiates the transition from active state to Control Hold Mode, and when the F-PDCH is assigned, the base station 1 controls the transition from active state to Control Hold Mode. The mobile station 2 is not allowed to initiate the transition to Control Hold Mode.

When base station 1 initiates the transition from active state to Control Hold Mode, the transition is generally the same as in Rev. C of cdma2000 1xEV-DV, wherein the transition from active state to Control Hold Mode is controlled by the base station 1. When the inactivity timer at the base station 1 expires, layer 3 messages (e.g., Extended Release Mini-Message) are used to initiate the state transition.

One skilled in the art will recognize that the teachings herein provide for certain variations or other embodiments not disclosed herein. Further, while the invention disclosed herein is described in the context of a specific cdma system, (i.e., a cdma2000 system), it should be realized that certain aspects of this invention have a broader utility. Thus the invention should not be construed as being limited solely to a cdma2000 system, or only to cdma2000 systems. It is considered that these other embodiments are within the teachings herein.

What is claimed is:

1. A method comprising:
   initiating a transition by a mobile station from a Control Hold Mode of a reverse link packet data channel for communication between a base station and the mobile station to an active state of the reverse link packet data channel, by sending a transition mode request to the base station;
   turning on a rate request channel by the mobile station, the mobile station requesting a reverse link transmission;
   monitoring a rate grant channel with the mobile station;
   acknowledging the reception of the transition mode request by sending an individual grant to the mobile station from the base station, thereby granting permission to transmit;
   transitioning the mobile station to the active state of the reverse link packet data channel upon receipt of the grant, the mobile station starting to transmit on the reverse link packet data channel in autonomous mode; and,
   commencing monitoring of a Forward Acknowledgement Channel with the mobile station.

2. A method as in claim 1, further comprising initiating a transition by the mobile station from the active state of the reverse link packet data channel to the Control Hold Mode of the reverse link packet data channel.

3. A method as in claim 2, wherein initiating a transition by the mobile station from the active state of the reverse link packet data channel to the Control Hold Mode of the reverse link packet data channel comprises:
   gating a reverse pilot and a reverse rate request channel by the mobile station;
   detecting by the base station the transition by the mobile station from the active state of the reverse link packet data channel to the Control Hold Mode of the reverse link packet data channel;
   stopping transmission on the Forward Acknowledgement Channel by the base station;
   stopping monitoring of the reverse link packet data channel by the base station; and
   transitioning the mobile station to the Control Hold Mode.

4. A method as in claim 3, wherein the base station controls the transition from the active state of the reverse link packet data channel to the Control Hold Mode of the reverse link packet data channel when a Forward Packet Data Channel is assigned.

5. A method as in claim 1, wherein a reverse rate request channel is gated at a reduced rate of one half or less.

6. A method as in claim 1, wherein the rate of the grant channel is reduced to reduce mobile station power consumption.

7. A method comprising:
   initiating a transition by a mobile station from a Control Hold Mode of a reverse link packet data channel for communication between a base station and the mobile station to an active state of the reverse link packet data channel, by sending a transition mode request to the base station;

turning on a rate request channel by the mobile station, the mobile station requesting a reverse link transmission;

commencing monitoring of a rate grant channel and a Forward Acknowledgement Channel with the mobile station;

acknowledging the reception of the transition mode request by sending an individual grant to the mobile station from the base station, thereby granting permission to transmit;

commencing continuous transmission by the mobile station on a reverse channel quality indication channel;

turning on a reverse acknowledgement channel;

commencing monitoring of a Forward Packet Data Control Channel; and, transitioning the mobile station to the active state of the reverse link packet data channel upon receipt of a control message with specific message type, the mobile station starting to transmit autonomous rate on the reverse link packet data channel.

8. A method as in claim 7, wherein the reverse channel quality indication channel is gated at a reduced rate of one half or less.

9. A method comprising:

initiating a transition from a Control Hold Mode of a reverse link packet data channel for communication between a base station and a mobile station to an active state of the reverse link packet data channel by sending a transition mode request from the base station to the mobile station;

setting an extended message type identifier indicating that the mobile station is to exit the Control Hold Mode;

further initiating the transition by sending a medium access control identification code by the base station via a Forward Packet Data Control Channel to the mobile station;

turning on a Reverse Channel Quality Indication Channel and a Reverse Acknowledgement Channel by the mobile station;

monitoring the Forward Packet Data Control Channel; and transitioning the mobile station to the active state of the reverse link packet data channel, wherein the mobile station transmits on the reverse link packet data channel in the active state of the reverse link packet data channel.

10. A method comprising:

assigning medium access control identification codes (MAC_IDs) from a MAC_ID space to each of a first group of a plurality of mobile stations in an ascending order from the MAC_ID space, wherein the plurality of mobile stations communicate with an apparatus; and assigning MAC_IDs to each of a second group of the plurality of mobile stations in a descending order from the MAC_ID space, wherein the first group of mobile stations use at least a reverse link channel to communicate with the apparatus and the second group of mobile stations use a forward link channel to communicate with the apparatus.

11. A method as in claim 10, wherein the first group of mobile stations use a first acknowledgement channel, and the second group of mobile stations use a second acknowledgement channel.

12. A method comprising:

assigning medium access control identification codes (MAC_IDs) from a MAC_ID space to each of a first group of a plurality of mobile stations in an ascending order from the MAC_ID space, wherein the plurality of mobile stations communicate with an apparatus; and assigning MAC_IDs to each of a second group of the plurality of mobile stations in a descending order from the MAC_IDs space, wherein the MAC_IDs for the first and second groups of mobile stations are reserved in first and second blocks, respectively, and wherein mobile stations having MAC_IDs in the first block monitor a first bitmap field in a channel from the apparatus to the plurality of mobile stations and mobile stations having MAC_IDs in the second block monitor a second bitmap field in the channel.

13. A computer-readable medium tangibly embodying a program of computer-executable instructions executable by a network device to perform operations comprising:

assigning medium access control identification codes (MAC_IDs) from a MAC_ID space to each of a first group of a plurality of mobile stations in an ascending order from the MAC_ID space, wherein the plurality of mobile stations communicate with an apparatus; and assigning MAC_IDs to each of a second group of the plurality of mobile stations in a descending order from the MAC_ID space, wherein the first group of mobile stations use at least a reverse link channel to communicate with the apparatus and the second group of mobile stations use a forward link channel to communicate with the apparatus.

14. A computer-readable medium as in claim 13, wherein the first group of mobile stations use a first acknowledgement channel, and the second group of mobile stations use a second acknowledgement channel.

15. A computer-readable medium tangibly embodying a program of computer-executable instructions executable by a network device to perform operations comprising:

assigning medium access control identification codes (MAC_ID) from a MAC_ID space to each of a first group of a plurality of mobile stations in an ascending order from the MAC_ID space, wherein the plurality of mobile stations communicate with an apparatus; and assigning MAC_IDs to each of a second group of the plurality of mobile stations in a descending order from the MAC_ID space, wherein the MAC_IDs for the first and second groups of mobile stations are reserved in first and second blocks, respectively, and wherein mobile stations having MAC_IDs in the first block monitor a first bitmap field in a channel from the apparatus to the plurality of mobile stations and mobile stations having MAC_IDs in the second block monitor a second bitmap field in the channel.

16. A computer-readable medium tangibly embodying a program of computer-executable instructions executable by a mobile station to perform operations comprising:

sending a transition mode request to a wireless network to initiate a transition by the mobile station from a Control Hold Mode of a reverse link packet data channel to an active state of the reverse link packet data channel;

turning on a rate request channel;

requesting a reverse link packet data channel transmission;

monitoring a rate grant channel;

in response to a reception of an individual grant from the wireless network, transitioning to the active state of the reverse link packet data channel in response to receipt of the grant;

initiating transmission on the reverse link packet data channel in autonomous mode; and, monitoring a Forward Acknowledgement Channel.

17. The computer-readable medium of claim 16, wherein the reverse link packet data channel is in operation without an assigned Forward Packet Data Channel.

18. The computer-readable medium of claim 17, wherein the operations further comprise:

gating a reverse pilot and a reverse rate request channel;

stopping transmission on the Forward Acknowledgement Channel;

stopping monitoring of the reverse link packet data channel; and transitioning to the Control Hold Mode for the reverse link packet data channel.

19. The computer-readable medium of claim 16, wherein the reverse link packet data channel is in operation with an assigned Forward Packet Data Channel, and wherein the operations further comprise:

commencing continuous transmission on a reverse channel quality indication channel;

turning on a reverse acknowledgement channel; and, commencing monitoring of the assigned Forward Packet Data Control Channel.

20. The computer-readable medium of claim 19, wherein the mobile station responds to a received signal to control transition by the mobile station from the active state of the reverse link packet data channel into the Control Hold Mode of the reverse link packet data channel.

21. An apparatus comprising:

means for assigning medium access control identification codes (MAC_ID) from a MAC_ID space to each of a first group of a plurality of mobile stations in an ascending order from the MAC_ID space, wherein the plurality of mobile stations communicate with the apparatus; and means for assigning MAC_IDs to each of a second group of the plurality of mobile stations in a descending order from the MAC_ID space, wherein the first group of mobile stations use at least a reverse link channel to communicate with the apparatus and the second group of mobile stations use a forward link channel to communicate with the apparatus.

22. An apparatus as in claim 21, wherein the first group of mobile stations use a first acknowledgement channel, and the second group of mobile stations use a second acknowledgement channel.

* * * * *